April 10, 1951     J. MacBLANE     2,548,317
FISHING REEL
Filed March 29, 1947
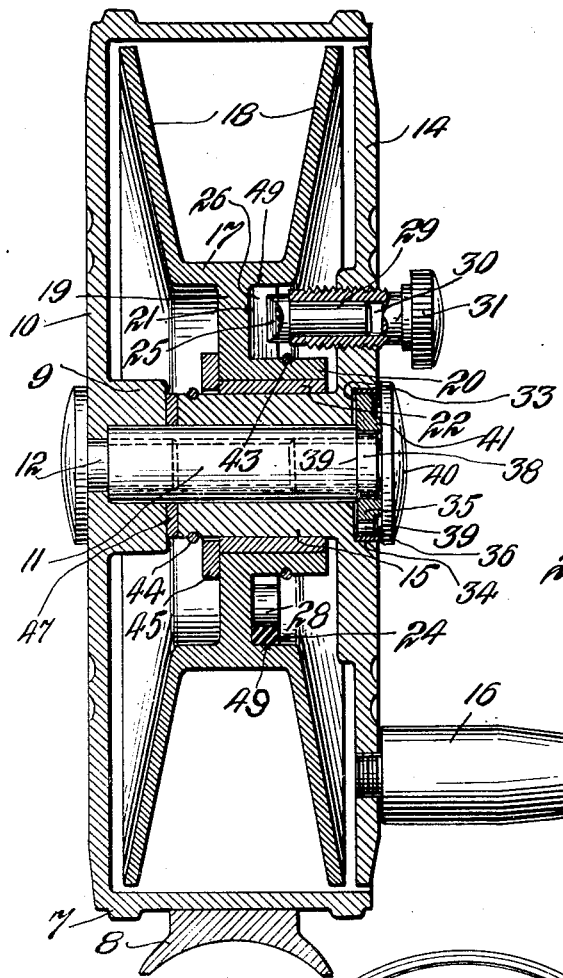
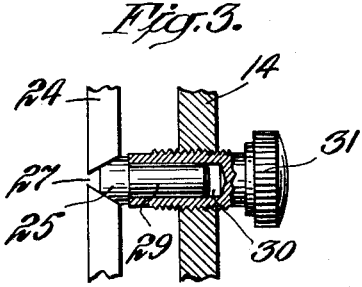
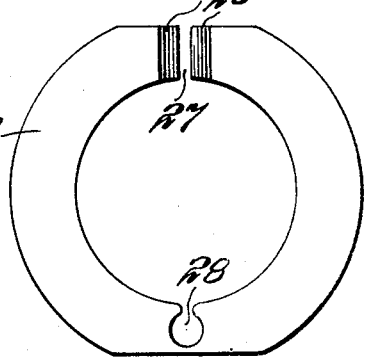
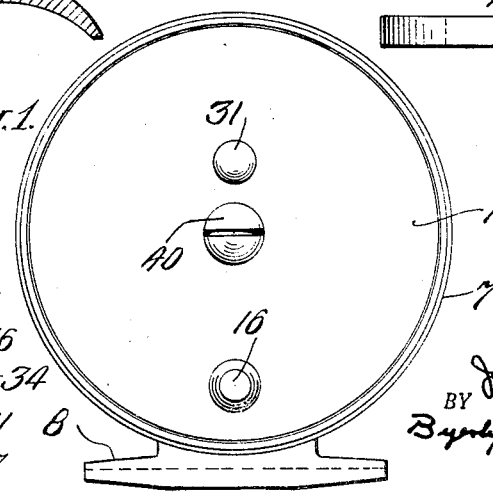
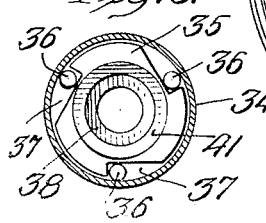
INVENTOR.
James MacBlane
BY Byerly, Watson + Simonds
ATTORNEYS Patented Apr. 10, 1951

2,548,317

UNITED STATES PATENT OFFICE 2,548,317

FISHING REEL

James MacBlane, Elmira, N. Y.

Application March 29, 1947, Serial No. 738,118

11 Claims. (Cl. 242—84.5)

This invention relates to fishing tackle and aims to provide an improved fishing reel.

The reel which I have invented is particularly useful in fresh-water fishing. The customary reels which have been used for such a purpose in the past have consisted of a frame through which the reel is attached to the butt of a rod; a line-holding spool supported on the frame for free rotation; and a handle positively connected with the spool by means of a crank to wind line upon the spool.

A serious disadvantage of those past customary reels has resulted from the fact that the handle and spool must rotate together. When such a reel is used in playing or landing a fish, the speed at which the line is payed out or rewound upon the reel corresponds with the speed at which the handle rotates. Attempts to regulate tension on the line by holding the handle of such a reel are very awkward and often entail strains which may result in the loss of the fish or even in breaking the tackle. This disadvantage in freshwater fishing reels has been overcome in deep-sea fishing reels through the use of a mechanism known as a "star drag." Through the use of such mechanism, relative movement between the spool and handle of a reel is possible. However, light weight is one of the primary requisites of fresh-water fishing reels and the "star drag" mechanism is too heavy and complicated for use in such reels.

Attempts have been made to overcome the disadvantages of past, customary fresh-water fishing reels by interposing a friction disc between a rotatable side plate and the hub of the spool. However, such reels have not proved to be acceptable, for they have not replaced the older, positive-crank type of reel to any appreciable extent.

I have discovered that the foregoing disadvantage of previous fresh-water fishing reels can be overcome and controlled relative movement between the spool and handle of the reel can be attained by connecting the handle with the spool of the reel through a friction clutch containing an expansible friction member. The friction exerted by my clutch is adjustable so that the varying conditions encountered in fresh-water fishing can be met. Nevertheless, my reel is light in weight and is constructed of a few, relatively simple parts which can be taken apart for cleaning and be reassembled very easily, and which permit the reel to be made at very low cost.

A fishing reel constructed in accordance with my invention includes a frame which supports a shaft, and a side plate provided with an inwardly-extending sleeve mounted for rotation on the shaft. The handle of the reel projects outwardly from that side plate. A spool is mounted for rotation on the sleeve of the side plate and is provided with an axial channel. A friction clutch is provided which is adapted to cause the spool to rotate with the side plate. The friction clutch includes an expansible split washer, which is mounted in the channel in the spool and is adapted to engage the outer wall of that channel, and a member, carried by the side plate, which engages the ends of the split washer and rotates that washer with the side plate. The side plate to which the handle is attached is preferably connected with the shaft through an overrunning clutch so that it can rotate on that shaft in only one direction.

In order that my invention will be clearly understood, I will describe the specific embodiment of it which I now prefer and which is illustrated in the accompanying drawings in which:

Fig. 1 is a side elevation of my reel;

Fig. 2 is an enlarged section along the axis of the reel illustrated in Fig. 1;

Fig. 3 is a fragmentary view, broken away in part, illustrating the friction clutch;

Fig. 4 is a front elevation of the split washer;

Fig. 5 is a side elevation of the washer illustrated in Fig. 4; and

Fig. 6 is an elevation, partly in section, of the overrunning clutch.

The reel illustrated in the drawings has a frame 7 fixed to a base 8 for attachment to the butt of a fly rod in the ordinary manner. A boss 9 projects inwardly from the side 10 of frame 7 and supports shaft 11 which is fixed to boss 9 by bolt 12. The other side of the frame 7 is closed by a detachable plate 14 having an inwardly-extending sleeve 15 mounted for rotation on the shaft 11. A handle 16 is fixed to the side plate 14.

The spool of my reel is mounted for rotation on the sleeve 15. It has a narrow cylindrical base 17 from which flanges 18 project outwardly to contain line which is wound upon the spool. The base 17 is connected through disc 19 with a sleeve 20 to provide a channel 21. A bushing 22 is preferably interposed between the sleeves 15 and 20.

The friction clutch with which my reel is equipped consists of an expansible split washer 24 mounted in the channel 21 and a wedge 25 carried by the side plate 14. The ends 26 of washer 24 are beveled to provide a notch-shaped space 27 between them. The washer is made of a flexible material such as laminated fibre impregnated with a plastic or material such as is ordinarily used as a lining for automobile brakes. It is recessed at 28 so that the ends 26 may be spread apart easily. The wedge 25 is mounted on a plunger 29 which fits into bore 30 of set screw 31.

The side plate 14 is recessed at 33 to receive an overrunning clutch which connects that plate and sleeve 15 with shaft 11 so that the sleeve and plate can rotate in only one direction. That overrunning clutch includes a cage 34, a disc 35 and roller bearings 36. The circumference of the cage 34 is such that it is gripped so tightly by the outer wall of recess 33 that rotary movement of side plate 14 with respect to cage 34 is prevented. The disc 35 contains pockets 37 for the roller bearings 36 and is mounted on the end 38 of shaft 11 which is reduced in circumference to provide a shoulder 39. The head of bolt 40 engages a sleeve 41 which projects outwardly from disc 35 and seats the disc 35 firmly against the shoulder 39 so that the disc cannot rotate.

In the assembled reel, the washer 24 is maintained in channel 21 by a ring 43 which fits in a groove provided for that purpose in sleeve 20. The sleeve 15 has a groove for a ring 44 which with washer 45 holds the spool and bushing 22 in position on the sleeve 15. A washer 47 is preferably interposed between the boss 9 and the end of sleeve 15.

The operation of the reel which I have described is as follows: The wedge 25 is adjusted so that it enters the notch 27 between the ends of the washer 24. The extent of such entrance is controlled by set screw 31. The size of the notch 27 and the size of the wedge 25 are such that as the set screw 31 is screwed in, the ends of washer 24 are pushed away from each other expanding the washer and forcing its outer edge against the outer wall 49 of channel 21, increasing the frictional resistance between those surfaces. As the wedge 25 is withdrawn by screwing set screw 31 outwardly, the ends of washer 24 approach each other, decreasing the frictional resistance between the outer edge of the washer and the wall 49 of channel 21.

The overrunning clutch permits rotation of the side plate 14 by means of the handle 16 in a clockwise direction to wind line upon the spool but prevents counterclockwise rotation of the plate 14. The pull of a fish on the line may rotate the spool counterclockwise and tends to rotate the side plate 14 in the same direction. However, when the cage 34 is turned counterclockwise, the roller bearings are wedged between the floors of the pockets 37 and the inner wall of cage 34 preventing counterclockwise rotation of that cage and the side plate 14. When line is reeled in, the side plate 14 is turned in a clockwise direction and the roller bearings are then carried to the wide corners of the pockets 37 so that the cage 34, is not then locked to disc 35.

The set screw 31 is adjusted to give the desired frictional resistance so that a lure may be retrieved without any slippage between the washer and the spool, but, when a hooked fish exerts a strong pull on the line, the side plate 14 is held in a stationary position by the overrunning clutch and some slippage between the washer and spool may be permitted. Changes can be made in the adjustment of the friction clutch while a fish is being played, since the overrunning clutch prevents a pull on the line from rotating side plate 14. The fisherman can thus maintain a fairly constant tension on the line regardless of the action of the fish so that he keeps control over the fish in a relatively easy manner.

The terms which I have used in describing the embodiment of my invention which I now prefer are terms of description and not of limitation, and it is to be understood that modifications may be made in that specific embodiment of my invention without departing from the spirit of my invention as it is defined in the appended claims.

What I claim is:

1. A fishing reel comprising a frame, a shaft supported by the frame, a side plate, a sleeve extending inwardly from the side plate and mounted for rotation on said shaft, a handle extending outwardly from the side plate, a spool mounted for rotation on said sleeve and having an axial channel, and a friction clutch adapted to cause said spool to rotate with said sleeve comprising an expansible split washer mounted in the channel and adapted to engage its outer wall, and a member carried by the side plate and engaging the ends of the washer to rotate the washer with the side plate.

2. A fishing reel comprising a frame, a shaft supported by the frame, a side plate, a sleeve extending inwardly from the side plate and mounted for rotation on said shaft, a handle extending outwardly from the side plate, a spool mounted for rotation on said sleeve and having an axial channel, and a friction clutch adapted to cause said spool to rotate with said sleeve comprising an expansible split washer mounted in the channel, and a wedge carried by the side plate and adapted to engage the ends of said washer to separate them and force the washer against the outer wall of said channel.

3. A fishing reel comprising a frame, a shaft supported by the frame, a side plate, a sleeve extending inwardly from the side plate and mounted for rotation on said shaft, a handle extending outwardly from the side plate, a spool mounted for rotation on said sleeve and having an axial channel, and a friction clutch adapted to cause said spool to rotate with said sleeve comprising an expansible split washer mounted in the channel and having its ends spaced apart, and an adjustable wedge carried by the side plate and adapted to enter the space between the ends of said washer to force them apart and urge the washer against the outer wall of said channel.

4. A fishing reel comprising a frame, a shaft supported by the frame, a side plate, a sleeve extending inwardly from the side plate and mounted for rotation on said shaft, a handle extending outwardly from the side plate, a spool mounted for rotation on said sleeve and having an axial channel, and a friction clutch adapted to cause said spool to rotate with said sleeve comprising an expansible split washer of flexible material mounted in the channel, and a wedge carried by the side plate and engaging the ends of the washer to rotate the washer with the side plate and urge it against said outer wall.

5. A fishing reel comprising a frame, a shaft supported by the frame, a side plate, a sleeve extending inwardly from the side plate and mounted for rotation on said shaft, a handle extending outwardly from the side plate, a spool mounted for rotation on said sleeve and having an axial channel, and a friction clutch adapted to cause said spool to rotate with said sleeve comprising an expansible split washer of fibrous material mounted in the channel, and a wedge carried by the side plate and engaging the ends of the washer to rotate the washer with the side plate and urge it against said outer wall.

6. A fishing reel comprising a frame, a shaft supported by the frame, a side plate, a sleeve extending inwardly from the side plate and mounted for rotation on said shaft, a handle extending outwardly from the side plate, a spool mounted for rotation on said sleeve and having an axial channel, and a friction clutch adapted to cause said spool to rotate with said sleeve comprising an expansible split washer mounted in the channel and adapted to engage its outer wall and having its ends beveled to form a notch between them, and a wedge carried by the side plate and extending into the notch between said ends.

7. A fishing reel comprising a frame, a shaft supported by the frame, a side plate, a sleeve extending inwardly from the side plate and mounted for rotation on said shaft, a handle extending outwardly from the side plate, a spool mounted for rotation on said sleeve and having an axial channel, and a friction clutch adapted to cause said spool to rotate with said sleeve comprising a split washer of flexible material mounted in the channel and having its ends beveled to form a notch between them and a recess opposite said notch to permit said ends to be forced apart, and a wedge carried by the side plate and adapted to enter said notch to force said ends apart and urge the washer against the outer wall of said channel.

8. A fishing reel comprising a frame, a shaft supported by the frame, a side plate, a sleeve extending inwardly from the side plate and mounted for rotation on said shaft, a handle extending outwardly from the side plate, a spool mounted for rotation on said sleeve and having an axial channel, and a friction clutch adapted to cause said spool to rotate with said sleeve comprising an expansible split washer mounted in the channel and having its ends beveled to form a notch between them, and an adjustable wedge carried by the side plate and adapted to enter said notch to force apart said ends and urge the washer against the outer wall of said channel.

9. A fishing reel comprising a frame having an open side, a shaft supported by the frame, a detachable plate adapted to close said open side, a sleeve extending inwardly from the side plate and mounted for rotation on said shaft, a handle extending outwardly from the side plate, a spool mounted for rotation on said shaft, a handle ex- an axial channel, and a friction clutch adapted to cause said spool to rotate with said sleeve comprising an expansible split washer mounted in the channel and having its ends beveled to form a notch between them, and an adjustable wedge carried by the side plate and adapted to enter the notch to force said ends apart and urge the washer against the outer wall of said channel.

10. A fishing reel comprising a frame, a shaft fixed to the frame, a side plate, a handle extending outwardly from the side plate, a sleeve extending inwardly from the side plate and mounted for rotation on said shaft, an overrunning clutch connecting the side plate with the shaft to prevent rotation of the side plate in one direction, a spool mounted for rotation on said sleeve and having an axial channel, and a friction clutch adapted to cause said spool to rotate with said side plate comprising an expansible split washer mounted in the channel and adapted to engage its outer wall, and a member carried by the side plate and engaging the ends of the washer to rotate the washer with the side plate.

11. A fishing reel comprising a frame, a shaft fixed to the frame, a side plate, a handle extending outwardly from the side plate, a sleeve extending inwardly from the side plate and mounted for rotation on said shaft, an overrunning clutch connecting the side plate with the shaft to prevent rotation of the side plate in one direction, a spool mounted for rotation on said side plate and having an axial channel, and a friction clutch adapted to cause said spool to rotate with said side plate comprising an expansible split washer mounted in the channel and having its ends spaced apart, and an adjustable wedge adapted to enter the space between the ends of said washer to force them apart and urge the washer against the outer wall of said channel.

JAMES MacBLANE.

REFERENCES CITED

The following references are of record in the file of this patent:

UNITED STATES PATENTS

| Number | Name | Date |
|---|---|---|
| 1,358,049 | Atwood | Nov. 9, 1920 |
| 2,126,227 | Stanley | Aug. 9, 1938 |
| 2,257,023 | Ray | Sept. 23, 1941 |
| 2,263,237 | Fiscus | Nov. 18, 1941 |
| 2,271,883 | Bannister | Feb. 3, 1942 |

FOREIGN PATENTS

| Number | Country | Date |
|---|---|---|
| 110,666 | Australia | May 22, 1940 |